(12) United States Patent
Klemen et al.

(10) Patent No.: US 7,833,119 B2
(45) Date of Patent: Nov. 16, 2010

(54) POWERTRAIN WITH SERIES ELECTRIC LAUNCH AND ELECTRIC POWER ASSISTED PERFORMANCE

(75) Inventors: Donald Klemen, Carmel, IN (US); Michael R. Schmidt, Carmel, IN (US)

(73) Assignee: GM Global Technology Corporation, Inc., Detroit, MI (US)

( * ) Notice: Subject to any disclaimer, the term of this patent is extended or adjusted under 35 U.S.C. 154(b) by 419 days.

(21) Appl. No.: 11/233,979

(22) Filed: Sep. 23, 2005

(65) Prior Publication Data
US 2007/0072723 A1    Mar. 29, 2007

(51) Int. Cl.
*F16H 3/72* (2006.01)
*F16H 37/06* (2006.01)

(52) U.S. Cl. ............................. 475/5; 475/282; 475/288
(58) Field of Classification Search ...................... 475/5, 475/282, 288, 3; 180/65.3, 65.4, 65.6
See application file for complete search history.

(56) References Cited

U.S. PATENT DOCUMENTS

| 5,558,595 | A |   | 9/1996  | Schmidt et al. | 477/3 |
| 5,577,973 | A | * | 11/1996 | Schmidt        | 475/5 |
| 5,603,671 | A | * | 2/1997  | Schmidt        | 475/5 |
| 5,931,757 | A |   | 8/1999  | Schmidt        | 475/2 |
| 6,478,705 | B1|   | 11/2002 | Holmes et al.  | 475/5 |
| 6,527,658 | B2|   | 3/2003  | Holmes et al.  | 475/5 |
| 6,962,545 | B2| * | 11/2005 | Larkin         | 475/5 |
| 7,150,698 | B2| * | 12/2006 | Sakamoto et al.| 477/5 |
| 7,261,658 | B2| * | 8/2007  | Bucknor et al. | 475/5 |
| 2004/0204286 | A1 |   | 10/2004 | Stridsberg |  |
| 2007/0225098 | A1 | * | 9/2007  | Tabata et al. | 475/5 |

FOREIGN PATENT DOCUMENTS

| DE | 10246839 A1 | 4/2004 |
| EP | 1002689 A2  | 5/2000 |

\* cited by examiner

*Primary Examiner*—David D Le
*Assistant Examiner*—Derek D Knight
(74) *Attorney, Agent, or Firm*—Quinn Law Group, PLLC

(57) ABSTRACT

A powertrain includes an engine with an engine output member, such as a crankshaft, and a first motor/generator having a first rotor connected to the crankshaft for rotation therewith. A transmission includes a transmission input member, a transmission output member, and a differential gearing arrangement selectively operatively connecting the transmission input member and the transmission output member. A plurality of torque transmitting devices is selectively engageable to provide a plurality of fixed speed ratios between the transmission input member and the transmission output member. A second motor/generator includes a second rotor connected to the gearing arrangement to provide torque to the transmission output member. The transmission input member is selectively connectable to the engine output member and the first rotor to alternate between a series hybrid drive mode and a fixed ratio mode of powertrain operation. A corresponding method is also provided.

12 Claims, 3 Drawing Sheets

| SERIES LAUNCH | CLUTCH | | RATIO | STEP |
|---|---|---|---|---|
| 1 | C1 | X | 4.115 | |
| 2 | C1 | C4 | 4.115 | |
| 3 | C1 | C6 | 2.594 | 1.59 |
| 4 | C1 | C2 | 1.812 | 1.43 |
| 5 | C2 | C6 | 1.261 | 1.437 |
| 6 | C2 | C4 | 1.000 | 1.251 |
| 7 | C2 | C3 | 0.739 | 1.352 |

| SERIES LAUNCH | CLUTCH | | RATIO | STEP |
|---|---|---|---|---|
| 1 | C1 | X | 4.121 | |
| 2 | C1 | C4 | 4.121 | |
| 3 | C1 | C6 | 2.219 | 1.857 |
| 4 | C1 | C2 | 1.905 | 1.165 |
| 5 | C2 | C6 | 1.538 | 1.238 |
| 6 | C2 | C4 | 1.000 | 1.538 |
| 7 | C2 | C3 | 0.710 | 1.408 |

POWERTRAIN WITH SERIES ELECTRIC LAUNCH AND ELECTRIC POWER ASSISTED PERFORMANCE

TECHNICAL FIELD

This invention relates to hybrid powertrains having an engine, a transmission, and two motor/generators, and characterized by a series hybrid mode and fixed ratio mode of operation.

BACKGROUND OF THE INVENTION

Electrically variable vehicle transmissions (EVTs), such as those described in U.S. Pat. No. 5,931,757, employ two electric motor/generators. The electric motor/generators are coaxially oriented with an input shaft connectable to an engine, an output shaft, and a plurality of planetary gearsets each having respective first, second, and third members. Each motor/generator is operatively connected to a respective member of one of the planetary gearsets to provide a range or mode of transmission operation characterized by a continuously variable speed ratio between the input shaft and the output shaft. The continuously variable speed ratio is proportional to the speed of one of the motor/generators.

In light vehicles using gasoline or hydrogen engines, electrical friction losses in EVT motor windings, iron, and controllers may become more significant than in heavy-duty vehicles. These engines may not be as sensitive to speed for emissions, so some of the advantages of an electrically variable transmission may not be as significant in very light vehicles compared to heavy-duty vehicles.

SUMMARY OF THE INVENTION

A vehicle powertrain is provided that includes an engine having an engine output member such as a crankshaft. A first motor/generator has a first rotor that is connected to the engine output member for unitary rotation. A transmission includes a transmission input member, a transmission output member, and a geartrain having a plurality of gear members. A plurality of torque transmitting devices are operatively connected to the gear members and are selectively engageable to provide a plurality of fixed speed ratios between the transmission input member and the transmission output member. A second motor/generator includes a second rotor operatively connected to one of the plurality of gear members for unitary rotation.

The connection of the first rotor to the engine output member enables a series hybrid mode of powertrain operation wherein there is no mechanical connection between the engine output member and the transmission output member, such as during vehicle launch. In the series hybrid mode, electrical energy is supplied to the second motor/generator from an energy storage device and/or from the first motor generator as it is driven by the engine output member. The engine output member and the first rotor are selectively connectable to the transmission input member to provide a fixed-ratio mode of powertrain operation with a mechanical connection between the engine output member and the transmission output member.

The fixed-ratio mode of operation enables power transmission from the engine to the transmission output member without engagement of the motor/generators, thereby eliminating or minimizing electrical losses. Furthermore, the first motor/generator may be significantly smaller than the motor/generators typically used in other electrically variable transmissions. The direct connection of the first motor/generator to the engine output member enables the first motor/generator to start the engine.

The first motor/generator may be used for engine inertial energy absorption whereby the first motor/generator absorbs power from the engine during shifts between fixed speed ratios. The first motor/generator converts mechanical energy from the engine to electrical energy, which is then stored in an energy storage device and later used to power the electric motor/generators. The engine inertial energy absorption enables a reduction in clutch size and clutch wear. Reduced clutch size results in reduced spin losses in the transmission.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
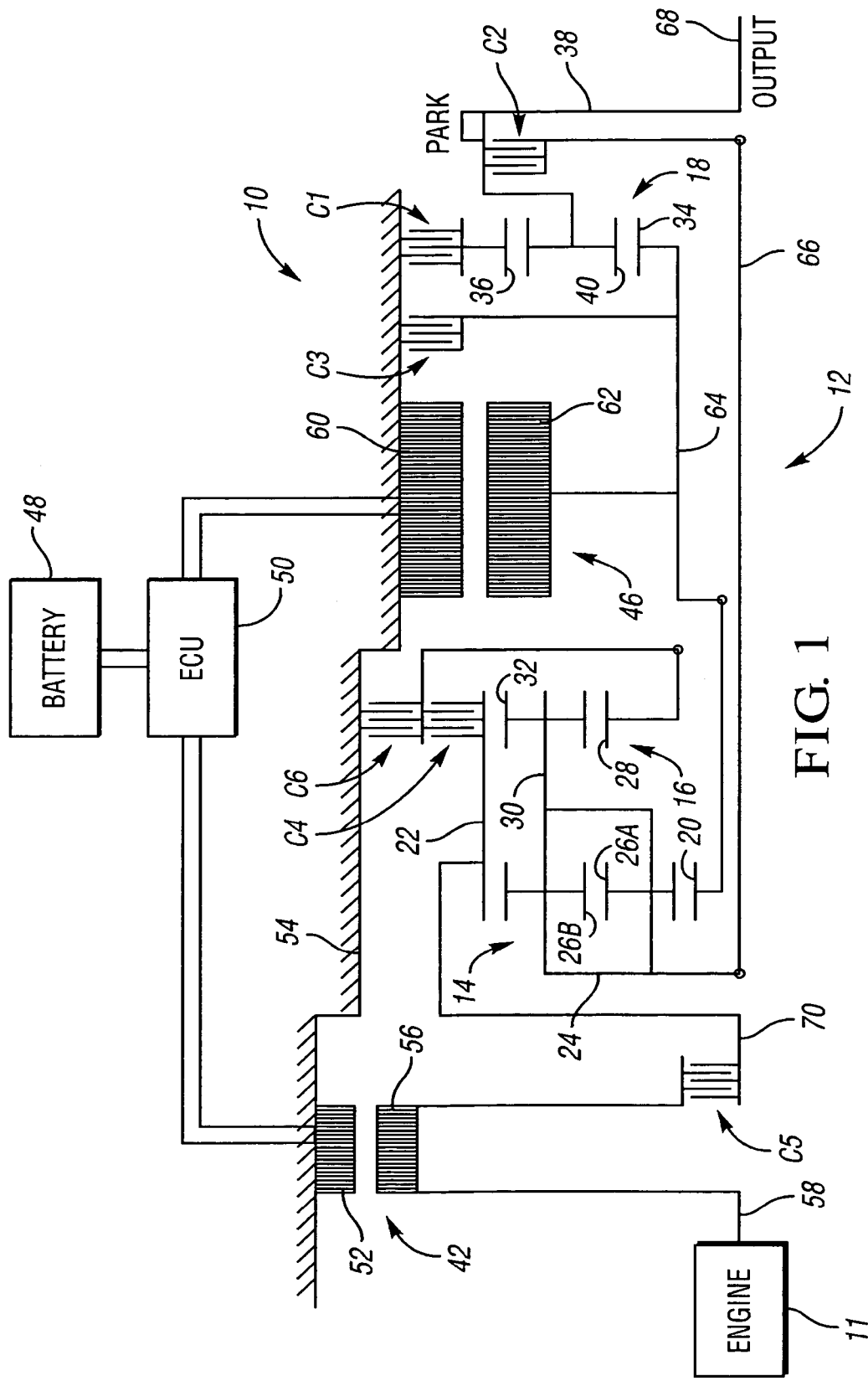
FIG. 1 is a schematic representation of a powertrain embodying the concepts of the present invention.

Referring to FIG. 1, a vehicle powertrain 10 is schematically depicted. The powertrain 10 includes an engine 11 and a transmission 12. The transmission 12 includes first, second, and third planetary gearsets 14, 16, 18, each having respective first, second, and third members. More specifically, the first planetary gearset 14 includes a sun gear member 20, a ring gear member 22, and a planet carrier assembly 24. The first planetary gearset 14 is compound, and thus planet carrier assembly 24 rotatably supports a first set of planet gears 26A that mesh with sun gear member 20. The planet carrier assembly 24 also rotatably supports a second set of planet gears 26B that mesh with the first set of planet gears 26A and with ring gear member 22.

The second planetary gearset 16 includes a sun gear member 28, ring gear member 22, and a planet carrier assembly 30. It should be noted that the ring gear member 22 is common to both the first and second planetary gearsets 14, 16. Accordingly, the ring gear of the first planetary gearset 14 and the ring gear of the second planetary gearset 16 are connected for unitary rotation. The planet carrier assembly 30 rotatably supports planet gears 32 that meshingly engage ring gear member 22 and sun gear member 28. Planet carrier assembly 24 is operatively connected to planet carrier assembly 30 for unitary rotation therewith. Alternatively, and within the scope of the claimed invention, planetary gearsets 14, 16 may share a common carrier assembly that rotatably supports planet gears 26A, 26B, and 32.

The third planetary gearset 18 includes sun gear member 34, ring gear member 36, and planet carrier assembly 38. The planet carrier assembly 38 rotatably supports planet gears 40 that meshingly engage ring gear member 36 and sun gear member 34. It should be noted that, where used in the claims, first, second, and third members of planetary gearsets do not necessarily refer to a member of a particular type; thus, for example, a first member may be any one of a ring gear member, sun gear member, or planet carrier assembly. Similarly, as used in the claims, the respective first, second, or third members of two or more gearsets may or may not be the same type of member.

The powertrain 10 also includes a first electric motor/generator 42 and a second electric motor/generator 46. An electrical storage device, such as battery 48, is provided for supplying current to motor/generators 42, 46 when they operate in a motoring mode, and receiving charging current from motor/generators 42, 46 when they operate in a generating mode. An electronic control unit (ECU) 50, including a microprocessor-based controller and suitable inverter circuitry, couples the battery 48 to motor/generators 42, 46, and controls the same in response to various input signals, including the driver torque request signal (not shown) and the output shaft speed signal (not shown). In a preferred embodiment, the motor/generators 42, 46 are configured as induction machines, although other configurations are also possible. The first electric motor/generator 42 includes a stator 52 rigidly affixed to a stationary member such as transmission housing 54. The first electric motor/generator 42 also includes a rotor 56. The rotor 56 is continuously connected to the crankshaft 58 of the engine 11 for substantially unitary rotation therewith.

The second electric motor/generator 46 includes a stator 60 that is affixed to the housing 54, and a rotor 62. The rotor 62 is connected to sun gear member 34 and sun gear member 20 for unitary rotation therewith via an interconnecting member, such as sleeve 64.

Planet carrier assembly 24 is operatively connected to main shaft 66 for rotation therewith. Planet carrier assembly 38 is operatively connected to an output member such as output shaft 68 for rotation therewith. An input member, such as input shaft 70, is connected to the ring gear member 22 for rotation therewith. Input shaft 70, output shaft 68, sleeve 64, and shaft 66 are rotatable about a common axis. The motor/generators 42, 46 and planetary gearsets 14, 16, 18 are coaxially aligned about the common axis.

The transmission 12 further includes a plurality of selectively engageable torque transmitting devices, or clutches, C1-C6. More particularly, clutch C1 is a brake configured to selectively couple ring gear member 36 to the housing 54. Clutch C2 selectively couples shaft 66 and the planet carrier assemblies 24, 30 of the first and second planetary gearsets 14, 16 to the planet carrier assembly 38 of the third planetary gearset 18, and, accordingly, to the output shaft 68, for unitary rotation. Clutch C3 is a brake configured to selectively couple sleeve 64, and therefore the rotor 62 of the second electric motor/generator 46, the sun gear member 20 of the first planetary gearset 14, and the sun gear member 34 of the third planetary gearset 18, to the housing 54. Clutch C4 is configured to selectively couple ring gear member 22 and sun gear member 28 for unitary rotation. Clutch C5 is selectively engageable to connect the rotor 56 and the crankshaft 58 to the input member 70 of the transmission 12 for substantially unitary rotation therewith. The input member 70 may be directly driven by the crankshaft 58 and rotor 56, or a transient torque damper (not shown) may be incorporated between the rotor 56 and the input member 70. An example of a transient torque damper of the type recommended for the present usage is disclosed in detail in U.S. Pat. No. 5,009,221, issued Apr. 23, 1991 to Spitler, and which is hereby incorporated by reference in its entirety. Clutch C6 is a brake configured to selectively couple sun gear member 28 to the housing 54.

Figures 2, 3, 4:
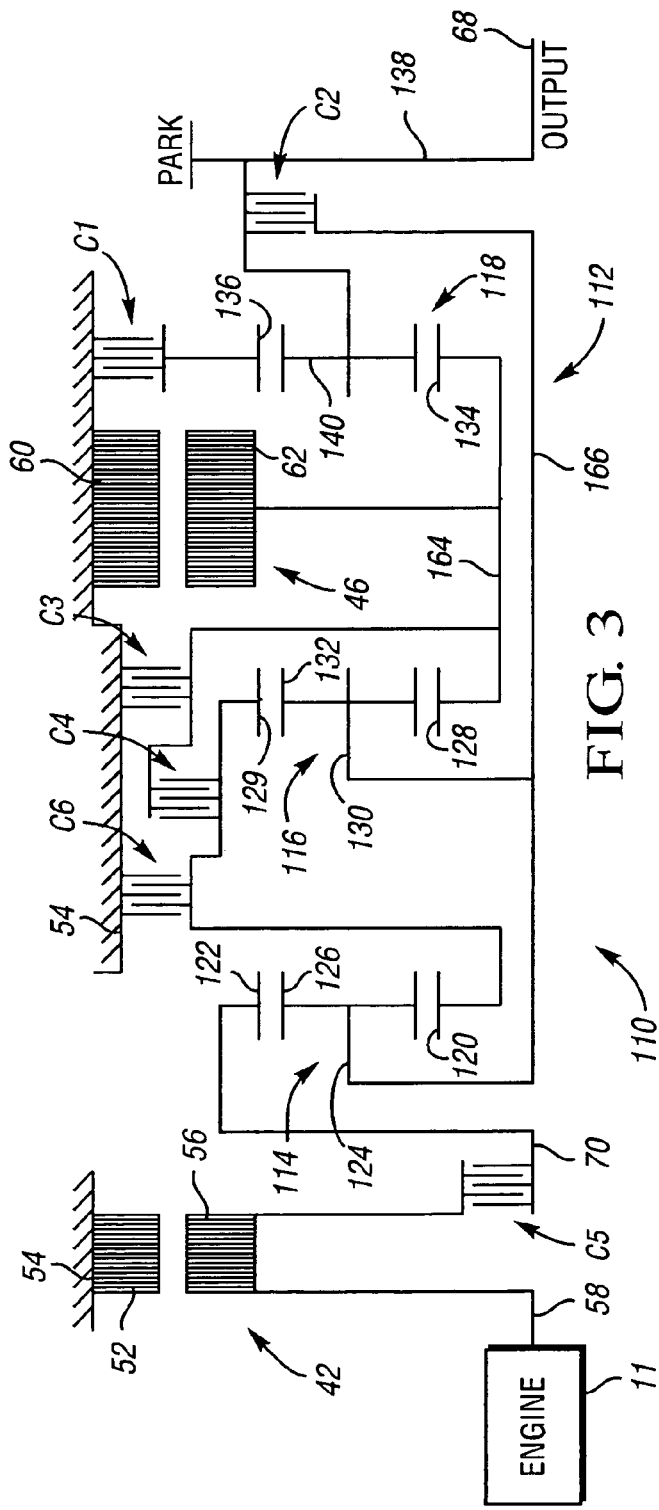
FIG. 2 is a fixed ratio truth table for the transmission of the powertrain depicted in FIG. 1.
FIG. 3 is a schematic representation of an alternative powertrain configuration embodying the concepts of the present invention.
FIG. 4 is a fixed-ratio truth table for the transmission of the powertrain depicted in FIG. 3.

The ECU 50 is configured to control the engagement of the torque transmitting devices C1-C6 via hydraulic actuation in a manner understood by those skilled in the art. Referring to FIGS. 1 and 2, the ECU 50 is programmed to provide a series mode of operation during vehicle launch, i.e., when the vehicle in which powertrain 10 is installed is at rest. In the series mode of operation, clutch C1 is engaged, clutches C2-C6 are disengaged, and motor/generator 46 supplies torque to the output shaft 68 via the third planetary gearset 18. The electric power to drive motor/generator 46 may be provided from the battery 48, from motor/generator 42 (driven by the engine 11), or a combination of both the battery and motor/generator 42. The series mode of operation is characterized by the absence of a mechanical connection between the engine 11 and the output shaft 68. It should be noted that ratios associated with a series mode of operation in the figures refer to the ratio between the second motor/generator 46 and the output member 68.

Subsequent to the series mode of operation, the ECU 50 is programmed to cause the engagement of clutch C5, at a time determined by inputs such as torque demand and output shaft speed, to connect the input shaft 70, and accordingly, ring gear member 22, to the rotor 56 and the crankshaft 58. The ECU 50 then controls the speed of the engine 11 so that clutch C4 speed synchronizes; clutch C4 is then applied to mechanically connect the engine 11 to the output shaft 68 through a first fixed speed ratio. First motor generator 42, second motor/generator 46, or both may provide torque to increase total power output to the wheels of the vehicle.

The transmission 12 is characterized by six fixed ratios. A second fixed speed ratio is achieved when clutches C1, C6, and CS are engaged and clutches C2-C4 are disengaged. A third fixed speed ratio is achieved when clutches C1, C2, and CS are engaged and clutches C3, C4, and C6 are disengaged. A fourth fixed ratio is achieved when clutches C2, C6, and CS are engaged, and clutches C1, C3, and C4 are disengaged. A fifth fixed ratio is achieved when clutches C2, C4, and CS are engaged, and clutches C1, C3, and C6 are disengaged. A sixth fixed speed ratio is achieved when clutches C2, C3, and C5 are engaged, and when clutches C1, C4, and C6 are disengaged. Shifting from the first fixed speed ratio through the sixth fixed speed ratio is asynchronous.

The ECU 50 may cause the first motor/generator 42 to operate as a generator during shifts to convert shift inertial energy to electrical energy which is stored in battery 48. The energy can then be released from the battery after the shift. More specifically, during the time when an offgoing clutch has lost capacity and before an oncoming clutch has gained capacity, motor/generator 42 can convert power from the engine 11 to electrical energy instead of allowing the power to dissipate as heat in the clutches.

Further, motor/generator 42 provides a direct means of starting the engine 11 via crankshaft 58 to reduce vibration issues.

Referring to FIG. 3, wherein like reference numbers refer to like components from FIG. 1, powertrain 110 includes an alternative transmission 112 configuration. The transmission 112 includes first, second, and third planetary gearsets 114, 116, 118, each having respective first, second, and third members. More specifically, the first planetary gearset 114 includes a sun gear member 120, a ring gear member 122, and a planet carrier assembly 124. Planet carrier assembly 124 rotatably supports a set of planet gears 126 that mesh with sun gear member 120 and with ring gear member 122.

The second planetary gearset 116 includes a sun gear member 128, ring gear member 129, and a planet carrier assembly 130. The planet carrier assembly 130 rotatably supports planet gears 132 that meshingly engage ring gear member 129 and sun gear member 128.

The third planetary gearset 118 includes sun gear member 134, ring gear member 136, and planet carrier assembly 138. The planet carrier assembly rotatably supports planet gears 140 that meshingly engage ring gear member 136 and sun gear member 134.

The transmission 112 also includes a first electric motor/generator 42 and a second electric motor/generator 46. An electrical storage device, such as the battery shown at 48 in FIG. 1, is provided for supplying current to motor/generators 42, 46 when operating in a motoring mode, and receiving a charging current from motor/generators 42, 46 when operating in a generating mode. An electronic control unit (not shown in FIG. 3) couples the battery to motor/generators 42, 46, and controls the same in response to various input signals, including the driver torque request signal (not shown) and the output shaft speed signal (not shown). The first electric motor/generator 42 includes a stator 52 rigidly affixed to a stationary member such as transmission housing 54. The first electric motor/generator 42 also includes a rotor 56. The rotor 56 is connected to the crankshaft 58 of the engine 11 for rotation therewith.

The second electric motor/generator 46 includes a stator 60 that is affixed to the housing 54, and a rotor 62. The rotor 62 is connected to sun gear member 134 and sun gear member 128 via an interconnecting member, such as sleeve 164, for unitary rotation therewith.

Planet carrier assembly 124 and planet carrier assembly 130 are operatively connected to main shaft 166 for rotation therewith. Sun gear members 128, 134 and rotor 62 are operatively connected to sleeve 164 for rotation therewith. Sun gear member 120 is operatively connected to ring gear member 129 for rotation therewith. Planet carrier assembly 138 is operatively connected to an output member such as output shaft 68 for rotation therewith. An input member, such as input shaft 70, is connected to the ring gear member 122 for rotation therewith.

The transmission 112 further includes a plurality of selectively engageable torque transmitting devices or clutches C1-C6. More particularly, clutch C1 is a brake configured to selectively couple ring gear member 136 to the housing 54. Clutch C2 selectively couples shaft 166, the planet carrier assembly 124 of the first planetary gearset 114, and the planet carrier 130 of the second planetary gearset 116 to the planet carrier assembly 138 of the third planetary gearset, and, accordingly, to the output shaft 68, for unitary rotation. Clutch C3 is a brake configured to selectively couple sleeve 164, and therefore the rotor 62 of the second electric motor/generator 46, the sun gear member 128 of the second planetary gearset 114, and the sun gear member 134 of the third planetary gearset 118, to the housing 54. Clutch C4 is configured to selectively couple ring gear member 129 and sun gear member 120 to sleeve 164 for unitary rotation. Clutch C5 is selectively engageable to connect the rotor 56 and the crankshaft 58 to the input member 70 of the transmission 112 for substantially unitary rotation therewith. Clutch C6 is a brake configured to selectively couple sun gear member 120 and ring gear member 129 to the housing 54.

Referring to FIGS. 3 and 4, the ECU is programmed to provide a series mode of operation wherein clutch C1 is engaged, clutches C2-C6 are disengaged, and motor/generator 46 supplies torque to the output shaft 68 via the third planetary gearset 118. The electric power to drive motor/generator 46 may be provided from the battery, from motor/generator 42 (driven by the engine 11), or a combination of both the battery and motor/generator 42.

The ECU is programmed to cause the engagement of clutch C5 at a predetermined time, based on inputs such as torque demand and output shaft speed, to connect the input shaft 70, and accordingly, ring gear member 122, to the rotor 56 and the crankshaft. The ECU then controls the speed of the engine 11 so that clutch C4 speed synchronizes; clutch C4 is then applied to mechanically connect the engine 11 to the output shaft 68 through a first fixed speed ratio. First motor generator 42, second motor/generator 46, or both may provide torque to increase total power output to the wheels of the vehicle.

The transmission 112 is characterized by six fixed ratios. A second fixed speed ratio is achieved when clutches C1, C6, and C5 are engaged and clutches C2-C4 are disengaged. A third fixed speed ratio is achieved when clutches C1, C2, and C5 are engaged and clutches C3, C4, and C6 are disengaged. A fourth fixed ratio is achieved when clutches C2, C6, and C5 are engaged, and clutches C1, C3, and C4 are disengaged. A fifth fixed ratio is achieved when clutches C2, C4, and C5 are engaged, and clutches C1, C3, and C6 are disengaged. A sixth fixed speed ratio is achieved when clutches C2, C3, and C5 are engaged, and when clutches C1, C4, and C6 are disengaged. Shifting from the first fixed speed ratio through the sixth fixed speed ratio is asynchronous.

Figures 5, 6:
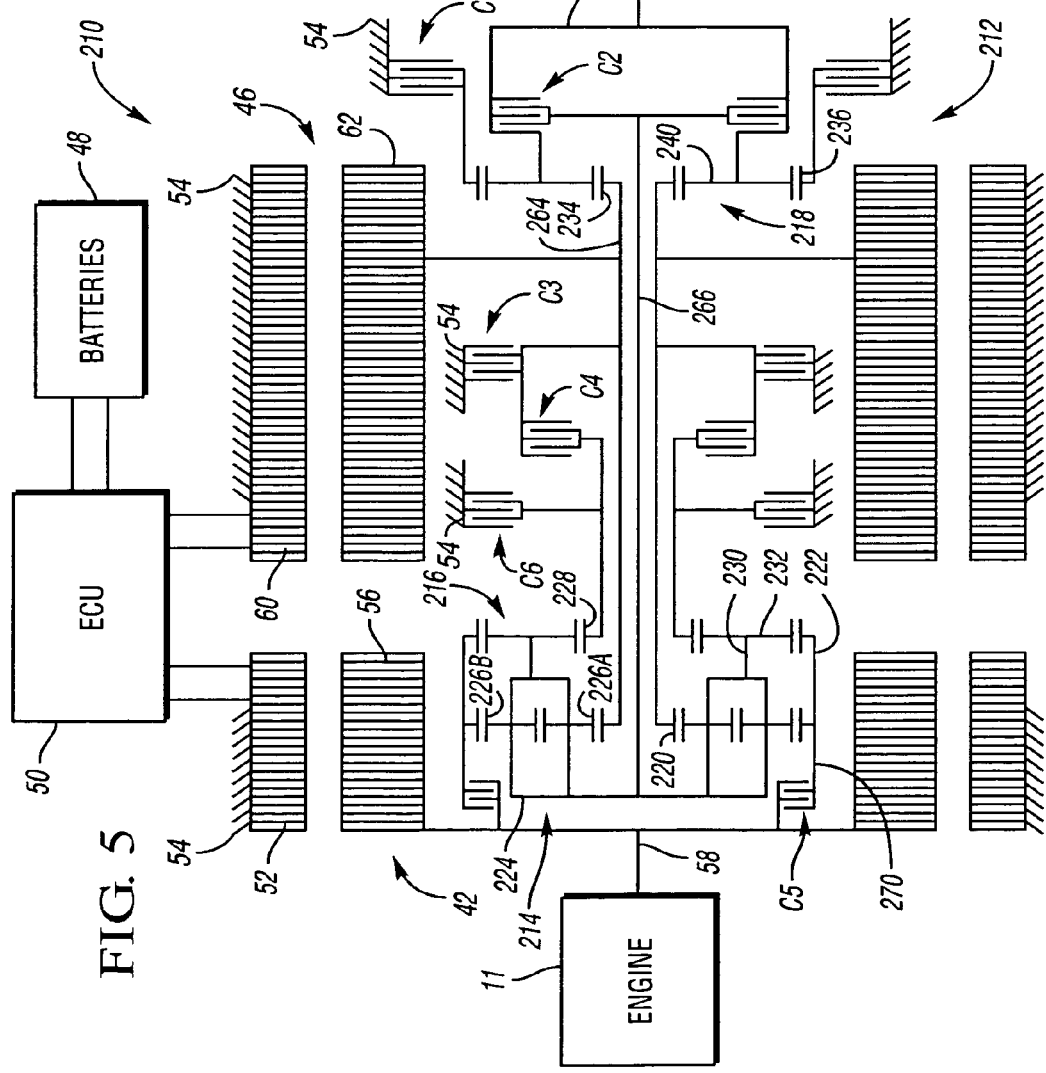
FIG. 5 is a schematic representation of another alternative powertrain configuration embodying the concepts of the present invention.
FIG. 6 is a fixed-ratio truth table for the transmission of the powertrain depicted in FIG. 5.

Referring to FIG. 5, powertrain 210 is similar the powertrain of FIG. 1, except clutch C4 interconnects different gear members. More specifically, first planetary gearset 214 includes sun gear member 220, ring gear member 222, and planet carrier assembly 224. The first planetary gearset 214 is compound, and thus planet carrier assembly 224 rotatably supports a first set of planet gears 226A that meshingly engage sun gear member 220. The planet carrier assembly 224 also rotatably supports a second set of planet gears 226B that meshingly engage the first set of planet gears 226A and ring gear member 222.

Second planetary gearset 216 includes sun gear member 228, ring gear member 222, and planet carrier assembly 230. The planet carrier assembly 230 rotatably supports planet gears 232 that meshingly engage ring gear member 222 and sun gear member 228. Planet carrier assembly 224 is operatively connected to planet carrier assembly 230 for unitary rotation therewith.

Third planetary gearset 218 includes sun gear member 234, ring gear member 236, and planet carrier assembly 238. The planet carrier assembly 238 rotatably supports planet gears 240 that meshingly engage ring gear member 236 and sun gear member 234.

The powertrain 210 also includes first electric motor/generator 42 and second electric motor/generator 46. An electrical storage device, such as battery 48, is provided for supplying current to motor/generators 42, 46 when they operate in a motoring mode, and receiving charging current from motor/generators 42, 46 when they operate in a generating mode. ECU 50 couples the battery 48 to motor/generators 42, 46, and controls the same in response to various input signals, including the driver torque request signal (not shown) and the output shaft speed signal (not shown).

The first electric motor/generator 42 includes a stator 52 rigidly affixed to a stationary member such as transmission housing 54. The first electric motor/generator 42 also includes a rotor 56. The rotor 56 is connected to the crankshaft 58 of the engine 11 for rotation therewith. The second electric motor/generator 46 includes a stator 60 that is affixed to the housing 54, and a rotor 62. The rotor 62 is connected to sun gear member 234 and sun gear member 220 for unitary rotation therewith via an interconnecting member, such as sleeve 264.

Planet carrier assembly 224 is operatively connected to main shaft 266 for rotation therewith. Planet carrier assembly 238 is operatively connected to an output member such as output shaft 68 for rotation therewith. An input member 270, is connected to the ring gear member 222 for rotation therewith. Input member 270, output shaft 68, sleeve 264, and shaft 266 are rotatable about a common axis. The motor/generators 42, 46 and planetary gearsets 214, 216, 218 are coaxially aligned about the common axis.

The transmission 212 further includes a plurality of selectively engageable torque transmitting devices or clutches C1-C6. More particularly, clutch C1 is a brake configured to selectively couple ring gear member 236 to the housing 54. Clutch C2 selectively couples shaft 266 and planet carrier assembly 224 to the planet carrier assembly 238 of the third planetary gearset, and, accordingly, to the output shaft 68, for unitary rotation. Clutch C3 is a brake configured to selectively couple sleeve 264, and therefore the rotor 62 of the second electric motor/generator 46, the sun gear member 220 of the first planetary gearset 214, and the sun gear member 234 of the third planetary gearset 218, to the housing 54. Clutch C4 is configured to selectively couple sun gear member 228 with the sleeve 264, and accordingly to rotor 62, sun gear member 220, and sun gear member 234, for unitary rotation. Clutch C5 is selectively engageable to connect the rotor 56 and the crankshaft 58 to the input member 270 of the transmission 212 for substantially unitary rotation therewith. Clutch C6 is a brake configured to selectively couple sun gear member 228 to the housing 54.

ECU 50 is configured to control the engagement of the torque transmitting devices C1-C6 via hydraulic actuation in a manner understood by those skilled in the art. Referring to FIGS. 5 and 6, ECU 50 is programmed to provide a series mode of operation during vehicle launch and a fixed ratio mode of operation subsequent to the series mode. The clutch engagement for the series mode and the fixed ratio modes are the same for the powertrain 210 of FIG. 5 and for the powertrain 10 of FIG. 1.

While the best modes for carrying out the invention have been described in detail, those familiar with the art to which this invention relates will recognize various alternative designs and embodiments for practicing the invention within the scope of the appended claims.

The invention claimed is:

1. A vehicle powertrain comprising:
an engine including an engine output member;
a first motor/generator including a first rotor connected to the engine output member for rotation therewith;
a transmission including a transmission input member selectively operatively connectable to the engine output member and the first rotor for rotation therewith, a transmission output member, a geartrain having a plurality of planetary gearsets with gear members that are configured to selectively operatively interconnect the transmission input member and the transmission output member, a second motor/generator including a second rotor operatively connected to one of the gear members for rotation therewith, and a plurality of torque transmitting devices that are selectively engageable to provide a plurality of fixed speed ratios between the transmission input member and the transmission output member that are independent of the speeds of the first and second motor/generators; and a control unit configured to selectively cause a series mode of operation characterized by the absence of a mechanical connection between the engine output member and the transmission output member and in which the second motor/generator provides torque to said one of the gear members;
wherein the control unit is configured to cause the engine output member to provide torque to the first rotor whereby the first motor/generator generates electrical energy during the series mode of operation.

2. The powertrain of claim 1, wherein the electrical energy generated by the first motor/generator is supplied to the second motor/generator.

3. The powertrain of claim 1, further comprising an energy storage device operatively connected to the first and second motor/generators; and wherein the control unit is configured to selectively control the flow of electrical energy between the first motor/generator, the second motor/generator, and the energy storage device.

4. The powertrain of claim 1, wherein the control unit is configured to selectively cause the connection of the first rotor and engine output member to the transmission input member to enable a fixed ratio mode of operation.

5. The powertrain of claim 4, wherein the control unit is configured to selectively cause the engagement and disengagement of selected ones of said plurality of torque transmitting devices during said fixed ratio mode of operation thereby to shift between said plurality of fixed speed ratios.

6. The powertrain of claim 5, wherein the control unit is configured to cause the first motor/generator to function as a generator during said engagement and disengagement of selected ones of said plurality of torque transmitting devices to absorb shift inertial energy.

7. A vehicle powertrain comprising:
an engine including an engine output member;
a first motor/generator including a first rotor connected to the engine output member for rotation therewith; and
a transmission including a transmission input member selectively operatively connectable to the engine output member and the first rotor for rotation therewith, a transmission output member, a geartrain having a plurality of gear members and configured to selectively operatively interconnect the transmission input member and the transmission output member, a plurality of torque transmitting devices that are selectively engageable to provide a plurality of fixed speed ratios between the transmission input member and the transmission output member, and a second motor/generator including a second rotor operatively connected to one of the plurality of gear members for rotation therewith;
wherein said geartrain includes first, second, and third planetary gearsets each having respective first, second, and third members;
said first member of said first planetary gearset being connected to said transmission input member for rotation therewith;
said first member of said second planetary gearset being connected to said first member of said first planetary gearset for rotation therewith;
said second member of said first planetary gearset being connected to said second member of said second planetary gearset for rotation therewith;
said first member of said third planetary gearset being connected to said transmission output member for rotation therewith; and said second member of said third planetary gearset being connected to said third member of said first planetary gearset and said second rotor for rotation therewith.

8. The powertrain of claim 7, further comprising a stationary member; and wherein said plurality of torque transmitting devices includes
   a first torque transmitting device configured to selectively connect said third member of said third planetary gearset to said stationary member;
   a second torque transmitting device configured to selectively connect said second member of said first planetary gearset and said second member of said second planetary gearset to said first member of said third planetary gearset and said transmission output shaft for unitary rotation;
   a third torque transmitting device configured to selectively connect said third member of said first planetary gearset, said second member of said third planetary gearset, and said second rotor to said stationary member;
   a fourth torque transmitting device configured to selectively connect said first member of said first planetary gearset and said first member of said second planetary gearset to said third member of said second planetary gearset for unitary rotation;
   a fifth torque transmitting device configured to selectively connect said engine output member and said first rotor to said transmission input member for unitary rotation; and
   a sixth torque transmitting device configured to selectively connect said third member of said second planetary gearset to said stationary member.

9. The powertrain of claim 8, wherein said first member of said first planetary gearset is a ring gear member; wherein said second member of said first planetary gearset is a planet carrier assembly; wherein said third member of said first planetary gearset is a sun gear member; wherein said first member of said second planetary gearset is a ring gear member; wherein said second member of said second planetary gearset is a planet carrier assembly; wherein said first member of said third planetary gearset is a planet carrier assembly; wherein said second member of said third planetary gearset is a sun gear member; and wherein said third member of said third planetary gearset is a ring gear member.

10. A method of controlling a powertrain, the method comprising:
   causing an engine output member to provide torque to a rotor of a first motor/generator such that the first motor generator generates electrical energy while the engine output member and the rotor are not mechanically connected to a transmission input member;
   supplying the electrical energy to a second motor/generator so that the second motor generator provides torque to a transmission output member via a geartrain having a plurality of planetary gearsets selectively operatively interconnecting the transmission input member and the transmission output member;
   connecting the engine output member and the rotor to the transmission input member subsequent to said supplying the electrical energy to the second motor/generator; and
   shifting from a first fixed speed ratio between the engine output member and the transmission output member to a second fixed speed ratio between the engine output member and the transmission output member by releasing a first torque transmitting device and engaging a second torque transmitting device, said first and second fixed speed ratios being independent of the speeds of the first and second motor/generators.

11. The method of claim 10, further comprising causing the first motor/generator to function as a generator during said shifting from a first fixed speed ratio between the engine output member and the transmission output member to a second fixed speed ratio between the engine output member and the transmission output member.

12. A vehicle powertrain comprising:
   an engine including an engine output member;
   a generator having a first rotor continuously operatively connected to the engine output member for unitary rotation therewith;
   a transmission including an input member, a plurality of planetary gearsets each having a plurality of members, and a transmission output member;
   a motor having a second rotor coupled to one of said members of said plurality of planetary gearsets for rotation therewith;
   a plurality of selectively engageable torque transmitting devices operative to selectively couple members of said planetary gearsets with said input member, a stationary member, or with other members of said planetary gearsets to provide a plurality of fixed forward speed ratios between the input member and the transmission output member that are independent of the speeds of the first and second rotors;
   one of said plurality of selectively engageable torque transmitting devices being configured to operatively couple said engine output member and said first rotor with said input member; and
   a control unit configured to selectively cause a series mode of operation characterized by the absence of a mechanical connection between the engine output member and the transmission output member and in which the motor provides torque to one of said members of said plurality of planetary gearsets;
   wherein the control unit is configured to cause the engine output member to provide torque to the first rotor whereby the generator generates electrical energy during the series mode of operation.

* * * * *